United States Patent
Lee et al.

(10) Patent No.: US 8,416,897 B2
(45) Date of Patent: Apr. 9, 2013

(54) RECEIVER FOR HIGH-SPEED WIRELESS COMMUNICATION SYSTEM AND CONTROL METHOD THEREOF

(75) Inventors: Il-Gu Lee, Seoul (KR); Hyun-Gu Park, Seoul (KR); Je-Hun Lee, Daejon (KR); Sok-Kyu Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 490 days.

(21) Appl. No.: 12/561,076

(22) Filed: Sep. 16, 2009

(65) Prior Publication Data

US 2010/0150278 A1  Jun. 17, 2010

(30) Foreign Application Priority Data

Dec. 15, 2008  (KR) ........................ 10-2008-0127376

(51) Int. Cl.
*H04B 7/10* (2006.01)
*H04L 27/06* (2006.01)

(52) U.S. Cl.
USPC ............................ 375/347; 375/340; 455/355

(58) Field of Classification Search .................. 375/347, 375/340; 455/355, 272
See application file for complete search history.

(56) References Cited

U.S. PATENT DOCUMENTS

| | | | | |
|---|---|---|---|---|
| 6,912,248 | B1* | 6/2005 | Wakabayashi | 375/229 |
| 2008/0136603 | A1* | 6/2008 | Choi et al. | 340/10.33 |
| 2008/0139156 | A1* | 6/2008 | Behzad et al. | 455/296 |
| 2008/0280648 | A1* | 11/2008 | Miyagawa et al. | 455/558 |

FOREIGN PATENT DOCUMENTS

| | | |
|---|---|---|
| KR | 10-2008-0045015 A | 5/2008 |
| WO | 2008/064270 | 5/2008 |
| WO | WO 2008064270 A2 * | 5/2008 |

OTHER PUBLICATIONS

Il-Gu Lee et al., "Power Aware Wireless Receiver Design Utilizing Carrier Sensing Based on Cross-Correlation", IEEE ICSPCS 2008, Dec. 15, 2008.*
Mark Horowitz et al., "Low-Power Digital Design", IEEE Symposium on Low power electronics, pp. 8-11, Oct. 10-12, 1994.
Il-Gu Lee et al., "Cross Layer Design of Low Power Digital Receiver for Wireless Local Area Networks", IEEE ICC 2009, Jun. 14, 2009.

* cited by examiner

*Primary Examiner* — David C. Payne
*Assistant Examiner* — Brian J Stevens
(74) *Attorney, Agent, or Firm* — Kile Park Reed & Houtteman PLLC

(57) ABSTRACT

An apparatus for reducing power consumption of a receiver in a high-speed wireless communication system and a control method thereof are provided. The apparatus for processing a signal in a receiver of a wireless communication system includes a carrier sensor configured to sense a carrier used in the wireless communication system, a decoder configured to decode the detected carrier signal to a signal and data, and a controller configured to control supplying power and a clock only to the carrier sensor during carrier sensing, and supplying power and a clock to an overall receiver when a carrier is sensed.

10 Claims, 11 Drawing Sheets

RECEIVER FOR HIGH-SPEED WIRELESS COMMUNICATION SYSTEM AND CONTROL METHOD THEREOF

CROSS-REFERENCE TO RELATED APPLICATIONS

The present invention claims priority of Korean Patent Application No. 10-2008-0127376, filed on Dec. 15, 2008, which is incorporated herein by reference.

BACKGROUND OF THE INVENTION

1. Field of the Invention

The present invention relates to a receiver for a wireless communication system and a control method thereof; and, more particularly, to an apparatus for reducing power consumption of a receiver in a high-speed wireless communication system and a control method thereof.

2. Description of Related Art

In general, a wireless communication system enables wireless terminals to communicate without the limitation of mobility by transmitting data using a predetermined frequency. Such a wireless communication system has been continuously advanced. Recently, various high-speed wireless communication systems were introduced. A wireless terminal of such a wireless communication system performs wireless communication using a battery for eliminating the limitation of mobility. Since the wireless terminal has a limited power capacity due to the battery, many studies have been made to reduce power consumption of a wireless terminal. In case of a wireless terminal such as a Personal Digital Assistant (PDA), a mobile phone, and a laptop computer in support of a wireless Local Area Network (LAN), a wireless communication interface and a receiver consume the most of power.

A wireless terminal uses a wireless MODEM to communicate. Therefore, a maximum operation frequency was designed to be low in a physical (PHY) layer of a wireless MODEM in order to reduce power consumption of a wireless terminal. Also, a wireless MODEM is designed to have a minimum supply voltage or to have low complexity to reduce power consumption. Furthermore, a method of dynamically controlling a clock frequency and a supply voltage depending on processing load was introduced in order to reduce the power consumption.

However, there is limitation in reducing an operation frequency, minimizing a supply voltage, and reducing complexity due to the limitation of semiconductor fabrication technology. There is also a limitation in satisfying performance requirements of a system because there is a trade-off relation between the three elements for reducing the power consumption and performance.

As another method for reducing the power consumption of a wireless terminal, a method of controlling a mode of a Medium Access Control (MAC) layer has been studied to reduce energy. That is, such a MAC layer mode control method provides an active mode and a sleep mode. The active mode is a mode for waking up a wireless terminal only when a wireless terminal has data to exchange with the other party using an additional control signal that is exchanged with the other party at a regular interval. The sleep mode is a mode for making a wireless communication terminal not to use power when the wireless communication terminal does not have any data to exchange with the other party using an additional control signal exchanged with the other party at a predetermined interval.

Hereinafter, a mode based power consumption control method will be described. A wireless communication terminal has to be in an active mode all the time because the wireless communication terminal cannot predict when to receive data from the other wireless terminal although the wireless communication terminal knows when to transmit data. Since the wireless communication terminal has to be in the active mode all the times, the wireless communication terminal consumes a large amount of power although the wireless communication terminal does not transmit or receive data. Therefore, the wireless communication terminal enters to a sleep mode when the wireless communication terminal exchange messages with a transmitter and expects not having data to transmit or receive based on the message. When a wireless terminal needs to exchange data during the sleep mode, or at a predetermined time, the wireless terminal enters to the active mode.

In general, a control signal has a comparatively long time interval due to MAC layer hardware and software interruption problem. Therefore, there is limitation in using a sleep mode in a MAC layer due to trade-off relation between service quality such as throughput and delay and power consumption.

Accordingly, it has been demanded to develop a method for reducing power consumption of a wireless terminal in a wireless communication system.

SUMMARY OF THE INVENTION

An embodiment of the present invention is directed to providing an apparatus and method for reducing power consumption in a wireless communication system.

Another embodiment of the present invention is directed to providing an apparatus and method for reducing power consumption without degrading the performance of a wireless communication system.

In accordance with an aspect of the present invention, there is provided an apparatus for processing a signal in a receiver of a wireless communication system including a carrier sensor configured to sense a carrier used in the wireless communication system, a decoder configured to decode the detected carrier signal to a signal and data, and a controller configured to control supplying power and a clock only to the carrier sensor during carrier sensing, and supplying power and a clock to an overall receiver when a carrier is sensed.

In accordance with another aspect of the present invention, there is provided a method for processing a signal in a receiver of a wireless communication system, including sensing a carrier by supplying power and a clock to units for sensing carriers in the wireless communication system, and decoding a signal and data by supplying power to receiving units for decoding data after carriers are sensed.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

Figure 1A:
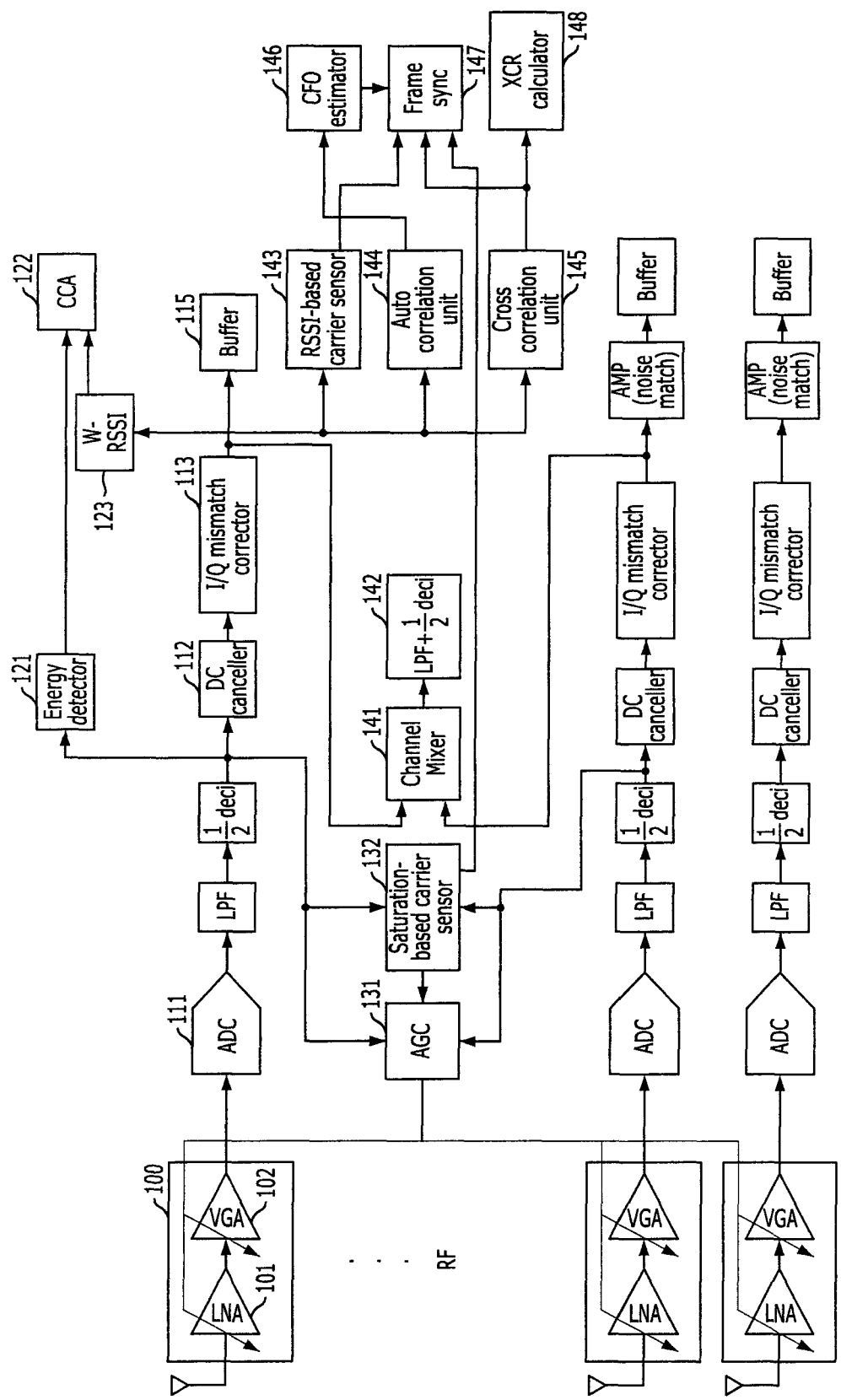
FIGS. 1A and 1B are a block diagram illustrating a receiver including a carrier sensor block and a non-carrier sensing block of a wireless communication system in accordance with an embodiment of the present invention.

The advantages, features and aspects of the invention will become apparent from the following description of the embodiments with reference to the accompanying drawings, which is set forth hereinafter.

Hereinafter, the fundamental concept of the present invention will be described before describing embodiments of the present invention. The present invention relates to a method for reducing power consumption of a receiver by controlling supplying power of the receiver depending on whether a signal exists on a wireless channel or not. The existence of a signal on the wireless channel may be determined using following two methods.

As a first method, signal existence on a wireless channel is determined through sensing a carrier. A physical layer (PHY) should always monitor a wireless channel to determine whether any carriers exist on a wireless channel by sensing wireless carriers. It is because the physical layer senses the carriers of a wireless channel by sensing a preamble. The preamble is information added in the front of data for synchronization by detecting characteristics of a wireless channel and for removing noise that may be generated in a wireless channel and analog elements. The wireless terminal can sense a carrier through determination of a saturation state of a wireless channel, through measuring energy, through measuring power, and through calculating cross-correlation using the preamble.

A second method is a virtual carrier sensing method. A carrier can be virtually sensed in a multiple access control (MAC) layer by sensing a packet having a MAC header with channel occupying time information. Since all wireless terminals can be aware of channel occupying times of other wireless terminals, a wireless terminal can virtually sense a carrier.

A receiver and control method thereof according to an embodiment of the present invention basically perform physical carrier sensing in a physical (PHY) layer through the determination of a saturation state, measuring energy, measuring power, and calculating cross-correlation, when a carrier is virtually not sensed in a MAC layer. The receiver and control method thereof according to the present embodiment activate only a carrier sensor using a gated clock before sensing a carrier. Then, the receiver and control method thereof according to the present embodiment activate all of constituent elements in the receiver after sensing a carrier.

The receiver and control method thereof according to the present embodiment turns off a physical carrier sensor of a physical layer when a virtual carrier is not sensed in a MAC layer. The receiver and control method thereof turns on a physical carrier sensor after a channel occupying time of the other terminal passes. The receiver and control method according to the present embodiment may further use a MAC layer control signal based low power protocol method together. The MAC layer control signal based power saving mode controls a receiver to enter into a power saving mode at a regular interval based on a control signal. Therefore, the receiver and control method according to the present embodiment enables a receiver to effectively use a power saving mode because the receiver and control method thereof according to present embodiment partially adapts the low power protocol method.

An apparatus according to an embodiment of the present invention includes a carrier sensing block and a non-carrier sensing block. Before the carrier sensing block senses a carrier, electric power and a clock are not supplied to the non-carrier sensing block. When the carrier sensing block senses a carrier, the electric power and the clock are supplied to the non-carrier sensing block. In case of applying the apparatus according to the present invention to a multiple antenna system that transmits high-speed multimedia contents through a wireless channel, the apparatus of the present invention enables a receiver to sense carriers using the minimum number of antennas. For example, the apparatus of the present invention enables a receiver to sense carriers using one antenna.

In case of using one antenna among a plurality of antennas in a multiple antenna system, it is preferable to supply electric power and a clock only to an antenna for carrier sensing before sensing a carrier. The power consumption can be minimized by applying electric power and a clock to remaining antennas after a carrier is sensed using one or the minimum number of antennas. If a clock gating method is applied with a MAC layer virtual carrier sensing method using a physical carrier sensing apparatus of a PHY layer, it is possible to reduce power consumption of a PHY layer carrier sensor. That is, a physical carrier sensor of a PHY layer is turned off when a virtual carrier is sensed at a MAC layer, and a physical carrier sensor of a PHY layer is turned on after a channel occupying time of the other terminal ends.

Hereinafter, the power consumption of a wireless terminal will be described. The power consumption of a wireless terminal can be expressed as dynamic power consumption $P_{Dynamic}$ and static power consumption $P_{Static}$ as shown in Eq. 1.

$$P = P_{Dynamic} + P_{Static} = C \cdot V_{Sig} \cdot f_0 \cdot n_t + V_{DD} \cdot I_{Static} \cdot e^{\frac{V_{DD}}{PV_t}} \quad \text{Eq. 1}$$

In Eq. 1, C denotes a switched total capacitance, $V_{Sig}$ indicates voltage swing, and $V_{DD}$ indicates a supply power. $f_0$ denotes an operation frequency and $n_t$ indicates the number of transition of a flip-flop per a clock cycle. As shown in Eq. 1, the dynamic power consumption $P_{Dynamic}$ is in proportion to switched overall capacitance, voltage swing, operation frequency, and the number of transitions of a flip-flop per a clock cycle. The static power consumption $P_{Static}$ is power statically consumed according to residual current from the ground and a power supply and current consumed by thermal noise and processes. Although the static power consumption is also important, the static power consumption is very dependable on the development of semiconductor process. The dynamic power consumption should be given more weight. The present invention relates to an apparatus and method for minimizing power consumption through reducing the number of transitions made by flip-flops. It is also possible to reduce the statistic power consumption by interrupting power supply using a regulator employing the present invention. Here, power consumption in a receiver can be induced by Eq. 2.

$$P_{RX}^{ps\text{-}on} = (T_{CP} \cdot P_{CS} + T_{non\text{-}cp} \cdot P_{Data}^{ps\text{-}on}) \cdot P_{CS_{suc}} + T \cdot P_{CS} \cdot (1 - p_{CS_{suc}}) \quad \text{Eq. 2}$$

Eq. 2 shows power consumption of a receiver in a power saving mode, power consumption for carrier sensing, and power consumption for data decoding. $p_{CSsus}$ indicates a probability of successfully sensing a carrier. $T_{CP}$ and $T_{non\text{-}cp}$ denote a time of a carrier sensing period and a time of non-carrier sensing period. The carrier sensing period is the sum of an idle time and a preamble period at a beginning part of a packet for carrier sensing. The idle time is a time of no signal on a wireless channel. For example, $T_{CP}$ and $T_{non\text{-}cp}$ can be expressed by Eq. 3.

$$T_{CP} = \text{Idle time} + T_{CS}$$

$$T_{non\text{-}cp} = T_{STF} - T_{CS} + T_{SIG} + T_{DATA}$$

$$T = T_{CP} - T_{nonCP} \quad \text{Eq. 3}$$

In Eq. 3, $T_{STF}$, $T_{CS}$, $T_{LTF}$, $T_{SIG}$, $T_{DATA}$, and T denote a short preamble period, a carrier sensing period in a short preamble period, a long preamble period, a signal field period, a data field period, and a period from end of transmitting one packet to end of transmitting the next packet.

Here, power consumed by constituent blocks in a digital front end of a wireless communication system is defined as follows. $P_{AGC}$ is defined as power consumption of an auto gain control block, and $P_{CSsat}$ is defined as power consumption of a saturation state detection based carrier sensing block. $P_{Energy}$ is defined as power consumption of an energy detection based carrier sensing block, and $P_{DC}$ is defined as power consumption of a DC compensation block. $P_{IQm}$ is defined as power consumption of an IQ mismatch correction block, and $P_{CHmx}$ is defined as power consumption of a channel mixer block. $P_{LPF,Deci}$ is defined as power consumption of a filter block, and $P_{CSrssi}$ is defined as power consumption of a receiving signal intensity based carrier sensing block. $P_{XCR}$ is defined as power consumption of a cross-correlation calculation based block, and $P_{CSxcr}$ is defined as power consumption of a cross-correlation based carrier sensing block. Under the definition, the power consumption of the energy detection based carrier sensing and the power based carrier sensing can be expressed as Eq. 4. The power consumption of the cross-correlation based carrier sensing method can be expressed as Eq. 5.

$$P_{CSerg} = P_{AGC} + P_{CSsat} + P_{Energy} \quad \text{Eq. 4}$$

$$P_{CSpwr} = P_{CSerg} + \sum_{i=1}^{k}(P_{DC(i)} + P_{IQ(i)}) + P_{CHmx} + P_{LPF,Deci} + P_{CSrssi}$$

$$PC_{XCR} = P_{CSerg} + P_{XCR}$$

$$P_{CS} = P_{CSerg} + G_{CSerg}\left\{\sum_{i=1}^{k}(P_{DC(i)} + P_{IQm(i)}) + P_{CHmx} + P_{LPF,Deci} + P_{CSrssi} + G_{CSpwr}(P_{XCR} + P_{CSxcr})\right\} \quad \text{Eq. 5}$$

In Eq. 4, $P_{AGC}$ denotes power consumption of an auto gain controller, $P_{CSsat}$ denotes power consumption of a saturation state detection based carrier sensing block, and $P_{Energy}$ is power consumption of an energy detection based carrier sensing block. $P_{DC(i)}$ denotes power consumption of a DC compensation block, and $P_{IQm(i)}$ indicates power consumption of an IQ mismatch correction block. $P_{CHmx}$ indicates power consumption of a channel mixer block, and $P_{LPF,Deci}$ denotes power consumption of a filter block. $P_{CSrssi}$ denotes power consumption of a receiving signal intensity based carrier sensing block, and $P_{XCR}$ denotes power consumption of a cross-correlation calculation based block. $P_{CSxcr}$ indicates power consumption of a cross-correlation based carrier sensing block.

In Eq. 4 and Eq. 5, k denotes the number of antennas in a receiver. Therefore, k cannot be bigger than the number of antennas in a receiver. Eq. 5 shows power consumed in a carrier sensor employing clock gating. G denotes a gated clock and it can be expressed as Eq. 6.

$$G_{CS}\left(\sum_{i=1}^{k}P_{sub\text{-}block(i)}\right) = \begin{cases} \text{if carrier sensed,} & 1 \\ \text{otherwise,} & 0 \end{cases} \quad \text{Eq. 6}$$

In Eq. 6, $P_{sub\text{-}block}$ can be calculated by Eq. 7.

$$P_{sub\text{-}block} = \sum_{l=1}^{T_{non\_CP}} c \cdot V_{sig} \cdot V_{DD} \cdot f_0 \cdot n_t^k(l)$$

$$= \omega \cdot f_0 \cdot \sum_{l=1}^{T_{non\_CP}} n_t^k(l) \quad \text{Eq. 7}$$

In Eq. 7, $\omega$ and $n_t^k(l)$ can be calculated by Eq. 8. Also, k indicates the number of flip-flops' bits. In general, a major source consuming power in a digital circuit is a flip-flop because the flip-flop changes to 1 and 0 corresponding to a clock at every operation frequency. Therefore, the number of flip-flops is considered in Eq. 7.

$$\omega = C \cdot V_{sig} \cdot V_{DD}$$

$$n_t^k(l) = n_{t(0 \to 1)}^k(l) + n_{t(1 \to 0)}^k(l) \quad \text{Eq. 8}$$

In Eq. 8, C denotes switched capacitance.

In Eq. 8, $n_t^k$ denotes the number of transitions of a k-bit flip-flop per one clock at a first sequence of a received signal. As a result, the overall power consumption of a receiver is in proportion to system complexity, supply power, operation frequency, and the number of transitions of a flip-flop. Therefore, the present invention relates a gated clock method using energy detection, power detection, and cross-correlation based carrier sensing in order to minimize power consumption.

Also, the present invention relates to an apparatus and method for reducing power consumption by using the minimum number of antennas to sense a carrier and turning on necessary antennas after sensing.

Eq. 9 shows overall power consumption of a receiver by calculating power consumption of a non-carrier sensing block by applying power consumption of a carrier sensing block using a gated clock.

$$P_{DATA} = P_{CS} + G_{CS}\Big(P_{ACR} + P_{SYNC} + (N_R - 1) \cdot P_{NM} + \sum_{i=1}^{N_R}(P_{BUF(i)} + P_{CRF(i)} + P_{FFT(i)} + P_{PHS(i)}) + P_{PLT} + P_{MIMO} + P_{DMP}\Big) \quad \text{Eq. 9}$$

In Eq. 9, $G_{CS}$ denotes a gating value for sensing a carrier, and $N_R$ denotes the number of antennas in a receiver.

Hereinafter, a receiver of a wireless communication system for reducing power consumption in accordance with an embodiment of the present invention will be described.

Figure 1B:
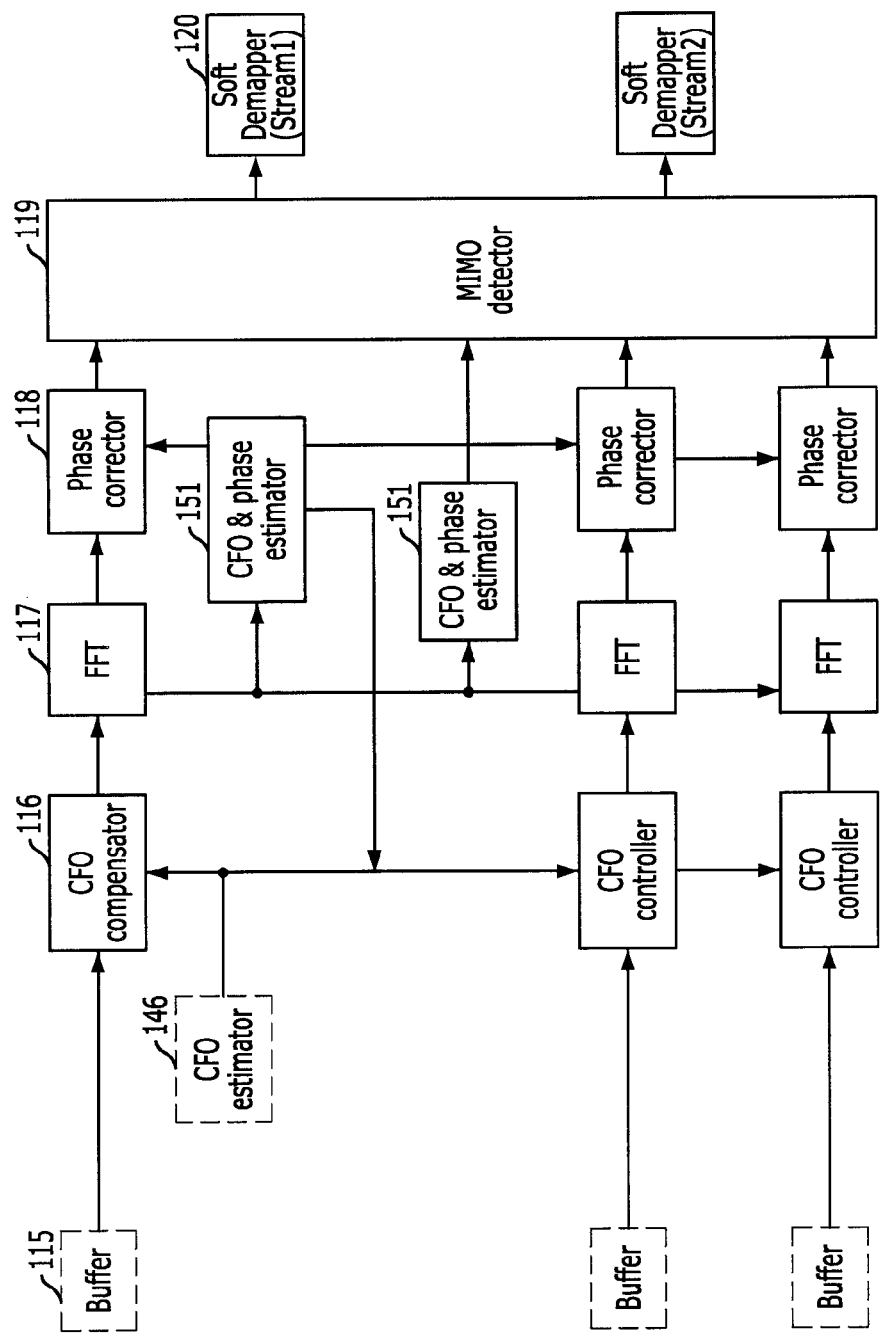

FIGS. 1A and 1B are block diagrams illustrating a receiver of a wireless communication system in accordance with an embodiment of the present invention. As shown, the receiver according to the present embodiment includes a carrier sensing unit and a non-carrier sensing unit.

FIGS. 1A and 1B exemplary show a multiple antenna system. Numeral references of the same elements that process a signal received through each antenna are omitted in FIGS. 1A and 1B. Since elements without numeral references assigned perform the same operations of like elements, detail description thereof is omitted.

Referring to FIGS. 1A and 1B, a RF block 100 process a radio frequency signal received from antennas. The RF block 100 includes a low noise amplifier 101 and a voltage control gain amplifier 102. The low noise amplifier 101 amplifies a signal from the antenna while suppressing noise thereof, and the voltage control amplifier 102 performs an amplifying operation. The RF block 100 converts a RF frequency band signal to a desired band signal and then converts the desired band signal from an analog signal to a digital signal through an analog-digital converter ADC 11. The digital signal is inputted to a DC canceller 112, an energy detector (energy detect) 121, an auto gain controller (AGC) 131, and a saturation-based carrier sensor 132.

The DC canceller 112 cancels DC components included in the digital signal. The DC component canceled signal is inputted to an I/Q mismatch compensator 113. An output signal of the I/Q mismatch compensator 113 is inputted to a buffer 115 and a channel mixer 141. The signal inputted to the buffer 115 is read at a predetermined interval and the read signal is inputted to a carrier frequency offset (CFO) compensator 116. The CFO compensator 116 detects a carrier frequency offset and controls the detected carrier frequency offset.

An output signal from the CFO compensator 116 is transformed by a Fast Fourier transform unit 117. That is, a time domain signal is transformed to a frequency domain signal. Then, a phase corrector 118 compensates phases, and an MIMO detector 119 detects a signal by each antenna, each band, or each stream. A soft de-mapper 120 de-maps the detected signal of the MIMO detector 119 to each antenna, each band, or each stream.

The energy detector 121 receives the digital signal outputted from the ADC 111 and detects an energy level of the digital signal. Then, the energy detector 121 outputs the detected energy level to a clear channel assessment unit 122 (CCA). The CCA unit 122 determines whether a signal is present in a channel or not and informs a MAC layer of the determination result. The saturation-based carrier sensor 132 receives the digital signal from the ADC 111 determines saturation by detecting a carrier signal. Also, the saturation-based carrier sensor 132 provides saturation information to the auto gain controller 131. The auto gain controller 131 controls a gain value of the low noise amplifier 101 and the voltage control gain amplifier 102 based on the received saturation information from the saturation-based carrier sensor 132.

A channel mixer 141 receives output signals of the I/Q mismatch compensator 113, mixes the received signals, and outputs the mixed signal. A low pass filter and a decimator (LPF+deci/2) 142 filters the received signal and decimate it to convert the received signal to the ½ down-sampling signal. The output signal of the low pass filter and the decimator 142 is inputted to a reception electric field strength measuring unit (W-RSSI) 123, a RSSI-based carrier sensor 143, an auto correlation unit 144, and a cross correlation unit 145. The reception electric field strength measuring unit 123 measures the reception electric field strength of a received signal and provides the measurement result to the CCA 122.

The RSSI-based carrier sensor 143 measures a reception electric field strength of a detected carrier signal if a carrier is detected and outputs the measurement result. The auto correlation unit 144 and the cross correlation unit 145 calculate and output correlation values. A CFO estimator 146 estimates a CFO and provides the estimated CFO to a frame synchronizer (sync) 147. The frame synchronizer 147 receives signals from the RSSI-based carrier sensor 143, the cross correlation unit 145, the saturation-based carrier sensor 132, and the CFO estimator 146 and detects frame synchronization. The CFO estimator 146 provides the estimated value to a CFO compensator 117 included in each antenna. A carrier sensing-based XCR calculator 148 calculates XCR.

The Fast Fourier transform unit 117 provides Fast-Fourier transformed information to a CFO and phase estimator 151. The CFO and phase estimator 151 estimates a CFO and a phase with a pilot based on the Fast-Fourier transformed information. The estimated phase information is provided to a phase corrector 118. The Fast Fourier transform unit 117 provides information to a channel estimator (CH Est.) 152 and the channel estimator 152 estimates a channel based on the provided information. The MIMO detector 119 outputs each stream signal using the channel estimation information from the channel estimator 152.

Figure 2:
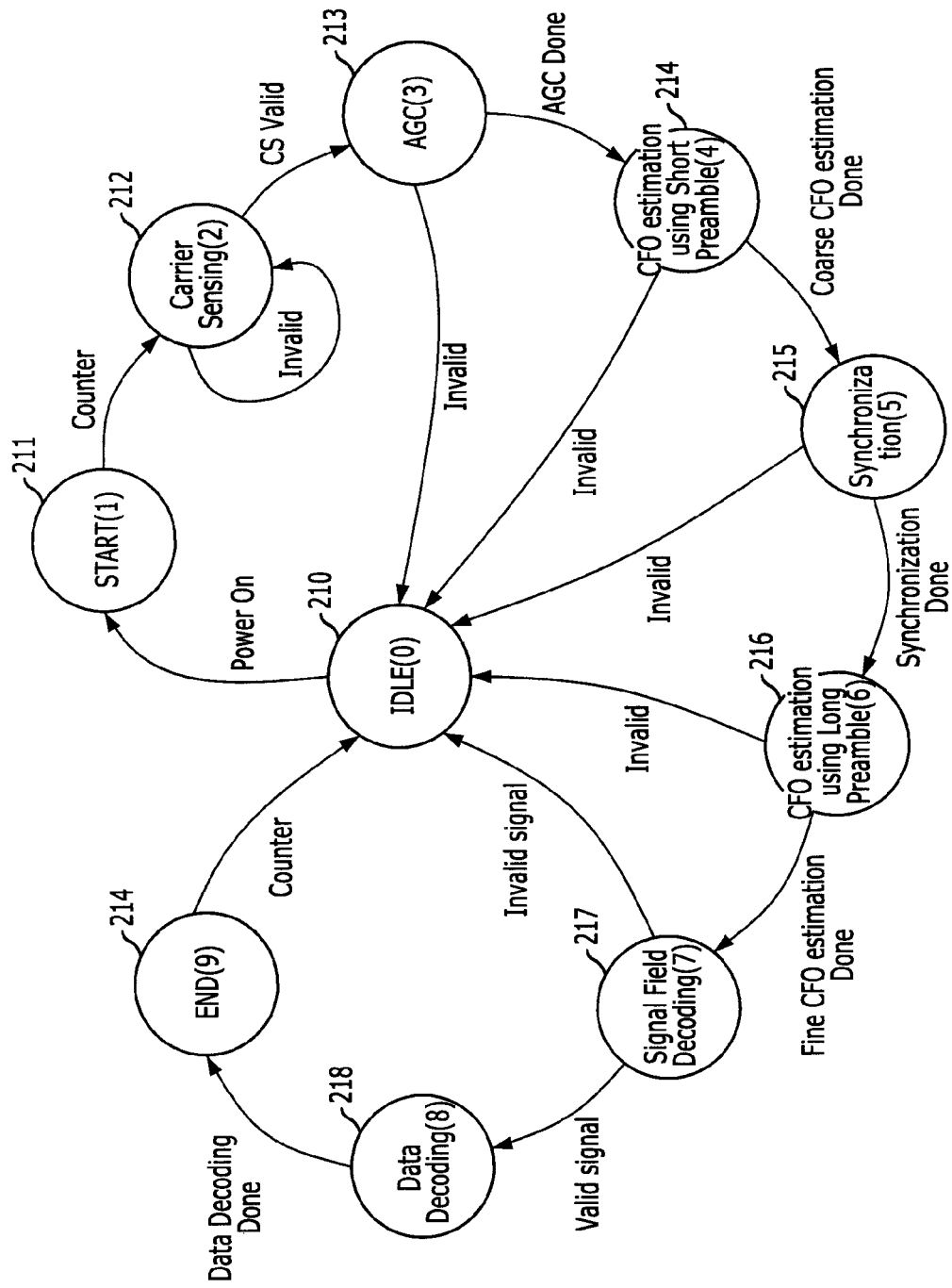
FIG. 2 is a state diagram for describing states of a receiver in accordance with an embodiment of the present invention.

FIG. 2 is a state diagram illustrating states of a receiver in accordance with an embodiment of the present invention.

In FIG. 2, an idle state 210 indicates one or all of an initial state, a standby state, and a power off state. When electric power is supplied in the idle state 210, a state of a receiver is shifted into a start state 211. If a carrier is sensed in a carrier sensing (CS) state 212, the receiver enters into an auto gain control (AGC) state 213 for controlling a gain of a received signal. In the AGC state 213, a gain of a received signal is controlled. After controlling the gain of the received signal, the receiver enters into a short-preamble based CFO estimation state 214 for estimating a CFO using a short preamble. After coarsely estimating the CFO, the receiver enters into a synchronization state 215 for synchronizing a signal from a system, that is, a frame. After the frame is synchronized, the receiver enters into a long-preamble CFO estimation state 216 for estimating a CFO based on the long preamble. In the long preamble based CFO estimation state 216, the receiver corrects a carrier frequency offset and synchronizes in a time domain after coarsely estimating a CFO in the state 214 and synchronizing frames in the state 215.

After estimating the CFO using the long preamble, the receiver enters into a signal field decoding state 217. In the signal field decoding state 217, the receiver decodes data. After decoding data, the receiver enters into an end state 219 and then enters into the idle state 210 again.

If a carrier is not sensed in the CS sate 212, the CS state 212 is continuously sustained. If the auto gain control fails in the AGC state 213, the AGC state 213 is shifted to the idle state 210. A state may be shifted into the idle state 210 as follows. At first, if it is impossible to coarsely estimate a CFO in the short-preamble based CFO estimation state 214, the short-preamble based CFO estimation state 214 is shifted into the idle state 210 again. Secondly, the synchronization state 215 may be shifted into the idle state 210 if there is no signal to synchronize. Thirdly, the long-preamble CFO estimation state 216 may be shifted into the idle state 210 if it is impossible to accurately estimate a CFO in the long-preamble CFO estimation state 216. Finally, the signal field decoding state 217 may be shifted into the idle state 210 if it fails to decode a signal field in the signal field decoding state 217.

In the present embodiment, the power consumption is minimized by interrupting supplying electric power and a clock to corresponding sub-blocks while the receiver is in states following the CS state. Due to the shown state diagram according to the present embodiment, the carrier sensing method and the non-carrier sensing method according to the present embodiment to be applied to a receiver.

Hereinafter, a carrier sensing apparatus according to an embodiment of the present invention will be described with reference to FIGS. 3, 4, and 5.

Figure 3:
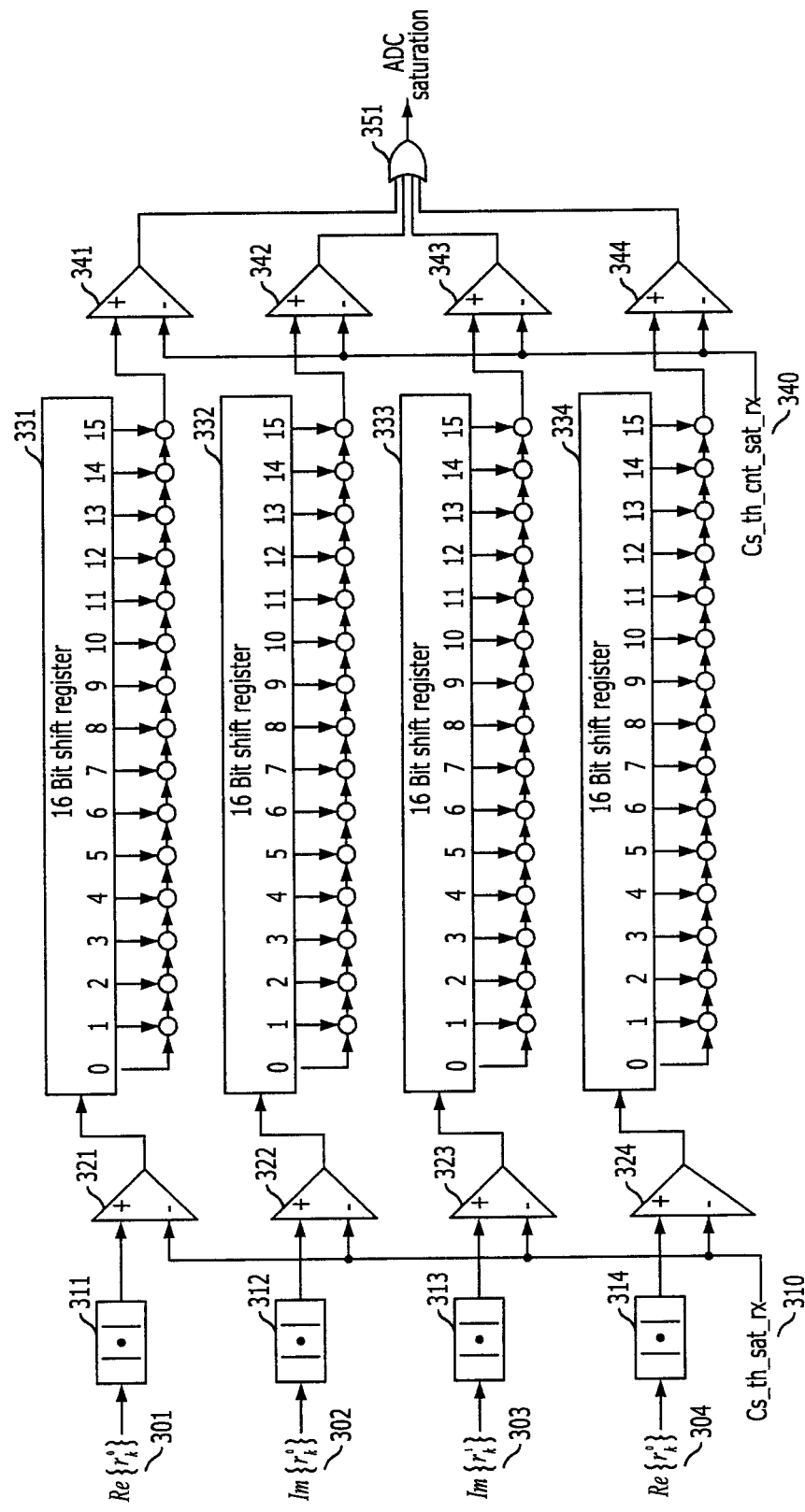
FIG. 3 is a circuit diagram of an energy and saturation state detector in accordance with an embodiment of the present invention.

FIG. 3 is a circuit diagram illustrating an energy saturation state detector in accordance with an embodiment of the present invention. FIG. 4 is a circuit diagram illustrating a power detector in accordance with an embodiment of the present invention, and FIG. 5 is a circuit diagram illustrating a cross-correlation extractor in accordance with an embodiment of the present invention.

At first, a structure and operation of an energy saturation state detector will be described. The energy saturation state detector according to the present embodiment receives signals $\text{Re}\{r_k^0\}$ 301, $\text{Im}\{r_k^0\}$ 312, $\text{Re}\{r_k^1\}$ 303, and $\text{Im}\{r_k^1\}$ 304. Absolute value calculators 311, 312, 313, and 314 of the energy and saturation state detector calculate absolute values of the input signals $\text{Re}\{r_k^0\}$ 301, $\text{Im}\{r_k^0\}$ 312, $\text{Re}\{r_k^1\}$ 303, and $\text{Im}\{r_k^1\}$ 304. In the input signals $\text{Re}\{r_k^0\}$ 301, $\text{Im}\{r_k^0\}$ 312, $\text{Re}\{r_k^1\}$ 303, and $\text{Im}\{r_k^1\}$ 304, k denotes an antenna index, and 0 and 1 indicate a channel index. Therefore, the channel index may be extended if more channels are used than a system shown in FIGS. 1 and 2.

The absolute calculators 311, 312, 313, and 314 output the calculated absolute values to positive input ends of comparators 321, 322, 323, and 324. The comparators 321, 322, 323, and 324 receive a receiving carrier saturation threshold value CS_th_sat_rx 310 through a negative input end. Each of the comparators 321, 322, 323, and 324 outputs a comparison result of two received values. As described above, the output information of the comparators 321, 322, 323, and 324 are inputted to shift registers 331, 332, 333, and 334. In FIG. 3, a 16-bit shift register is shown. The shift registers 331, 332, 333, and 334 output information by sequentially sifting the input value to the right side. As described above, the information is outputted through a previous calculation process. For example, it is assumed that latest information is inputted at a time t and that previous information were inputted at a time t-1, a time t-2, a time t-3, ..., and a time t-15. Under this assumption, the information inputted at a time t is outputted through a $0^{th}$ port, and the information inputted at a time t-1 is outputted through a $1^{st}$ port. The information outputted from the next port is calculated based on the outputs of the $0^{th}$ and $1^{st}$ ports. Each of the shift registers 331, 332, 333, and 334 outputs a signal to the corresponding one of the comparators 341, 342, 343, and 344 through a positive input end thereof. Each of the comparators 341, 342, 343, and 344 receives a Cs_th_cnt_sat_rx 340 through a negative input end thereof. Each of the comparators 341, 342, 343, and 344 compares the received signals and outputs a comparison result. The output signals of the comparators 341, 342, 343, and 344 are calculated through an OR gate, and ADC saturation is detected based on the calculation result. Here, the Cs_th_cnt_sat_rx 340 is a predetermined threshold value. If a sum of values stored in the shift registers is greater than the Cs_th_cnt_sat_rx 340, it means a saturation state. If not, it means a normal state. Therefore, the Cs_th_cnt_sat_rx 340 is a threshold value for determining a saturation state.

Hereinafter, a structure and an operation of a power detector will be described with reference to FIG. 4.

Figure 4:
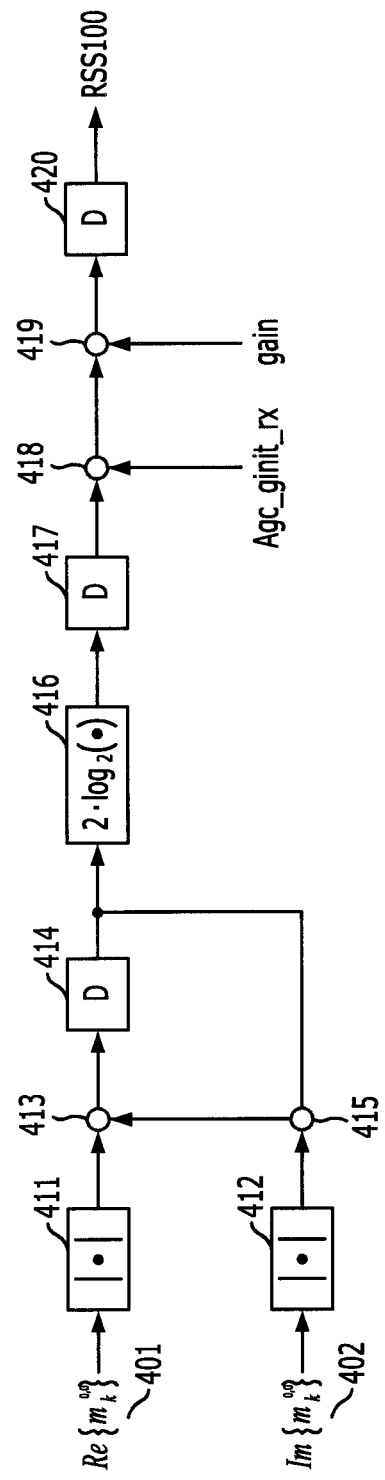
FIG. 4 is a circuit diagram illustrating a power detector in accordance with an embodiment of the present invention.

FIG. 4 is a circuit diagram illustrating a power detector in accordance with an embodiment of the present invention.

Referring to FIG. 4, the power detector according to the present embodiment includes absolute calculators 411 and 412, first and second adders 413 and 415, a first delay 414, a calculator 416, a second delay 417, a third adder 418, a fourth adder 419, and a third delay 420.

The power detector according to the present embodiment receives signals $\text{Re}\{m_k^{0,0}\}$ 401 and $\text{Im}\{m_k^{0,0}\}$ 402 and the received signals $\text{Re}\{m_k^{0,0}\}$ 401 and $\text{Im}\{m_k^{0,0}\}$ 402 are inputted to the absolute calculators 411 and 412. The absolute calculator 411 and 412 calculate absolute values of the received signals $\text{Re}\{m_k^{0,0}\}$ 401 and $\text{Im}\{m_k^{0,0}\}$ 402. The first adder 413 receives the absolute value of the signal $\text{Re}\{m_k^{0,0}\}$ 401 and the second adder 415 receives the absolute value of the signal $\text{Im}\{m_k^{0,0}\}$ 402.

The first adder 413 also receives an output signal of the second adder 415, sums up the received absolute value of the signal $\text{Re}\{m_k^{0,0}\}$ 401 and the output signal of the second adder 415, and outputs the summation to the first delay 414. The first delay 414 delays the summation from the first delay 414 and outputs the delayed summation to the second adder 415 and the calculator 416. Accordingly, the second adder 415 receives the delayed summation from the first delay 414 and the absolute value of the signal $\text{Im}\{m_k^{0,0}\}$ 402, sums up the two received signals, and outputs the summation to the first adder 413.

The calculator 416 receives the delayed summation from the first delay 414, performs a log calculation on the delayed summation, and outputs the log calculation result to the second delay 417. The second delay 417 delays the log calculation result as much as a predetermined time and outputs the delayed log calculation result to the third adder 418. The third adder 418 adds the log calculation result with an initial gain value Agc_ginit_rx of the auto gain controller and outputs the add result to the fourth adder 419. The fourth adder 419 adds the received add result from the third adder 418 with a gain value and outputs the add result to the third delay 420. The third delay 420 delays the add result of the fourth adder 419 and outputs the delayed result as a received electric field strength RSS.

Hereinafter, a structure and operation of a cross-correlation extractor will be described with reference to FIG. 5.

Figure 5:
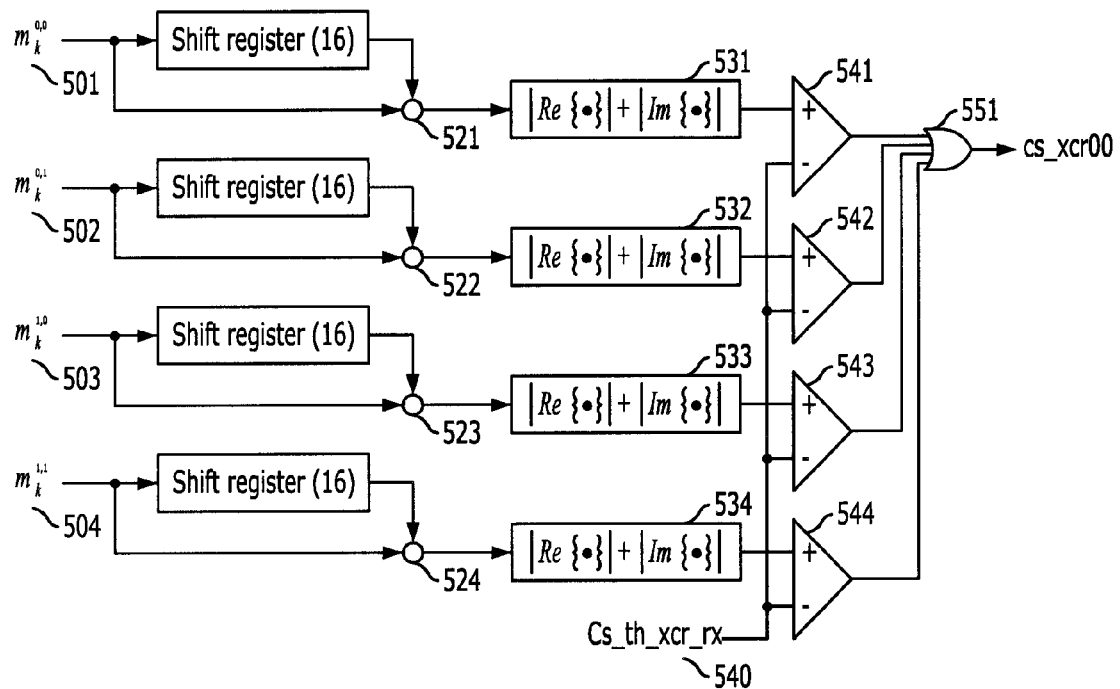
FIG. 5 is a circuit diagram illustrating a cross-correlation extractor in accordance with an embodiment of the present invention.

FIG. 5 is a diagram illustrating a cross-correlation extractor in accordance with an embodiment of the present invention.

Referring to FIG. 5, the cross-correlation extractor according to the present embodiment includes shift registers 511, 512, 513, and 514, adders 521, 522, 523, and 524, calculators 531, 532, 533, and 534, comparators 541, 542, 543, and 544, and an OR gate 551. The cross-correlation extractor receives signals $m_k^{0,0}$ 501, $m_k^{0,1}$ 502, $m_k^{1,0}$ 503, and $m_k^{1,1}$ 504. Each of the received signals $m_k^{0,0}$ 501, $m_k^{0,1}$ 502, $m_k^{1,0}$ 503, and $m_k^{1,1}$ 504 is inputted to one of the shift registers 511 to 514 and one of adders 521 to 524, respectively. The shift registers 511 to 514 sequentially shift the input information to the right and output the shifted information. Although a 16-bit shift register is exemplarily used as the shift register in the present embodiment, a size of the shift register may be changed according to information bits or detected bits of a signal, which is required in each system. Each of the adders 521 to 524 receives corresponding shifted information from the shift registers 521 to 514 and corresponding signals $m_k^{0,0}$ 501, $m_k^{0,1}$ 502, $m_k^{1,0}$ 503, and $m_k^{1,1}$ 504. Then, the adders 521 to 524 add the shifted information with the received signal and output the added information to the calculators 531 to 534. Each of the calculators 531 to 534 receive the information from the adders 521 to 524, divide the received information into a real number component and an imaginary number component, calculate absolute values of the real number component and the imaginary number component, and add the absolute values, and outputs the added absolute values. The comparators 541 to 544 receive the added absolute values from the calculators 531 to 534 through a positive input end and a signal Cs_th_xcr_rx 540 through a negative input end. Each of the comparators 541 to 544 compares the two signals and outputs the summation of two signals. The OR gate 551 receives the comparison results from the comparators 541 to 544, calculates a logical sum of the received comparison results, and outputs the logical sum as a signal cs_xcr00.

Figure 6:
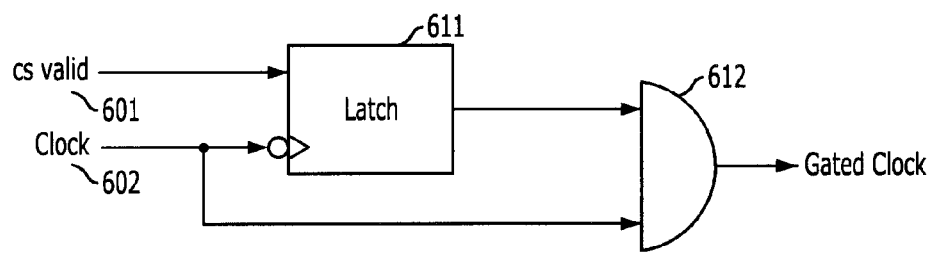
FIG. 6 is a diagram illustrating a clock gating circuit.

Meanwhile, the carrier sensing information outputted from the carrier sensing apparatus is transferred to a state shifting apparatus in a receiver, and electric power and clock are supplied to all of remaining blocks when a state of the receiver is shifted to other states from the CS state. Herein, a clock gating circuit is used, and it is shown in FIG. 6. When a carrier sensed, a CS valid signal 601 is outputted.

FIG. 6 is a diagram illustrating a clock gating circuit. Referring to FIG. 6, the clock gating circuit includes a latch 611, and an AND gate 612. The clock gating circuit receives a carrier sensing (CS) valid signal 601 and a clock 602. The received CS valid signal 601 and the clock are inputted to the latch 611. The latch 611 synchronizes the CS valid signal 601 with the clock 602 and outputs the synchronized CS valid signal. The AND gate 612 receives the synchronized CS valid signal from the latch 611 and the clock 602, performs a logical product on the received signals, and outputs the logical product result. That is, it is equivalent to gating a clock signal. That is, a clock signal is outputted only if the CS valid signal 601 is inputted. If not, the clock is not supplied. Therefore, the power consumption of a circuit can be reduced by applying a clock to a remaining circuit only if a block controlling shifting a state senses a carrier.

Figure 7:
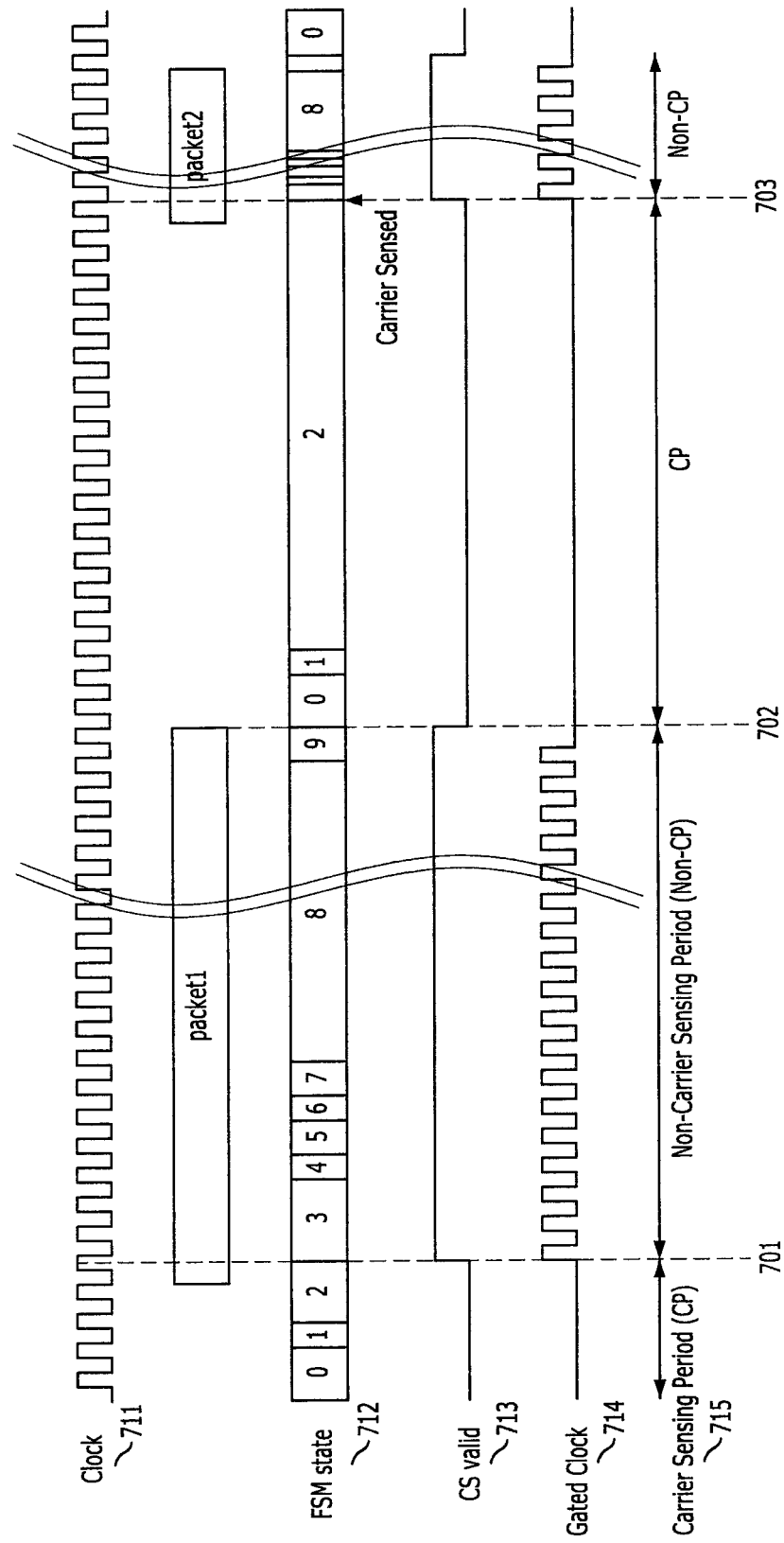
FIG. 7 is a timing diagram illustrating a power saving mode when two packets are transmitted in accordance with an embodiment of the present invention.

FIG. 7 is a timing diagram for describing a power saving mode in accordance with an embodiment of the present invention. The timing diagram of FIG. 7 shows the operations of the power saving mode when two packets are transmitted.

In FIG. 7, a clock 711 is continuously generated and supplied only to necessary parts. That is, during carrier sensing, the clock is supplied only to blocks for carrier sensing. The electric power is also supplied only to block for carrier sensing. That is, the electric power is not supplied to the other blocks except the block for carrier sensing. Therefore, as shown in FIG. 6, the clock gating circuit continuously interrupts the clock and the electric power are not supplied to the other blocks except the block for carrier sensing. Here, when a first packet is transmitted, a carrier is sensed at a time 701. When the packet transmission is detected as described above, a carrier sensing valid signal 713 is activated. From this moment, a gated clock signal 714 is provided. The gated clock signal 714 is provided to a demodulator and a decoder until a time 702, that is, until the packet transmission ends in order to receive, demodulate, and decode the detected packet. A carrier detection operation is not performed while decoding a packet after carrier sensing. That is, it becomes a non-carrier sensing period.

If carrier transmission ends, an operation for carrier sensing is performed by interrupting the clock and the electric power to all blocks except blocks for sensing a carrier. That is, it becomes a carrier sensing period. If a carrier is sensed again like a time 703 of FIG. 7, that is, if a second packet is transmitted, the clock and the electric power are supplied to other blocks for receiving packets. By repeating the above described processes, it is possible to reduce power consumption for receiving packets.

Hereinafter, the reduction of power consumption obtained by applying a power saving mode according to the present embodiment will be described.

Figure 8:
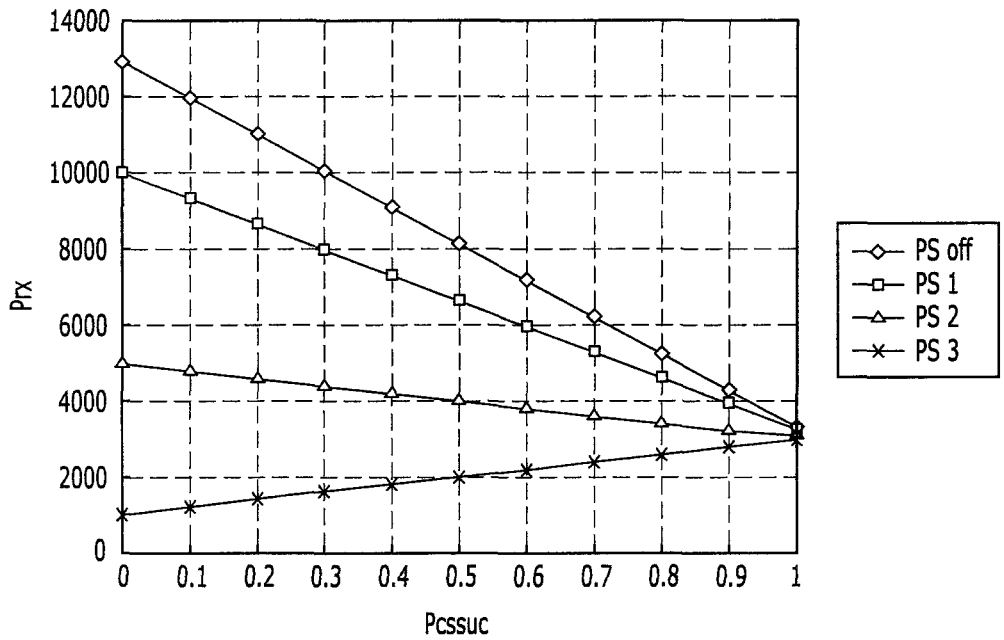
FIGS. 8 and 9 are graphs showing a simulation result of dynamic power consumption of a power saving mode in accordance with an embodiment of the present invention.
Figure 9:
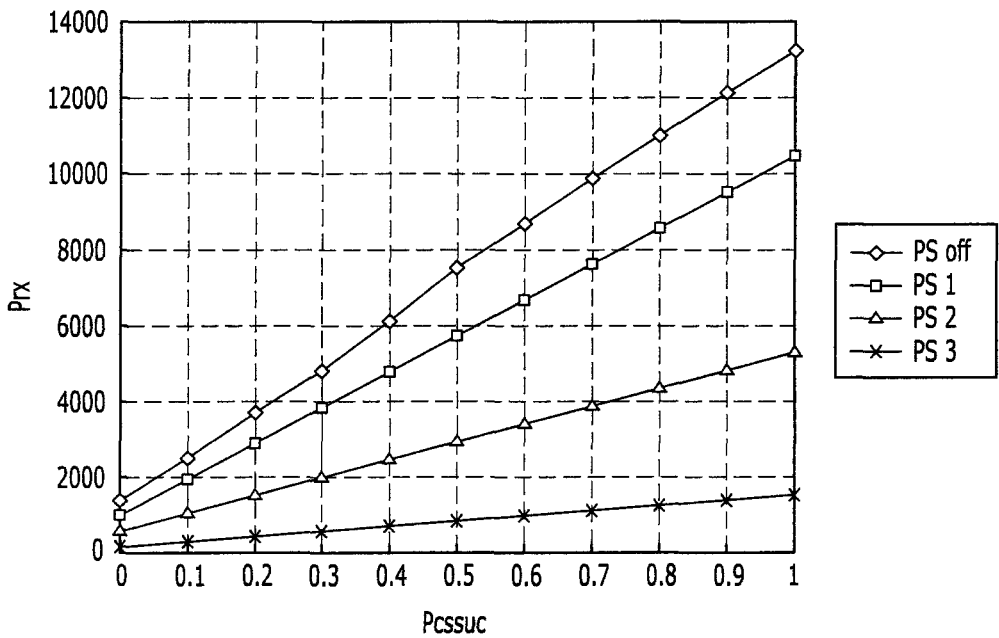

FIGS. 8 and 9 are graphs showing the dynamic power consumption simulation result when a receiver employs a power saving mode according to an embodiment of the present invention. That is, FIGS. 8 and 9 are simulation results using Eq. 2. FIG. 8 is a graph showing a simulation result of dynamic power consumption in case of employing a power saving mode when $T_{CP}$ is 3 us. FIG. 9 is a graph showing dynamic power consumption in case of employing a power saving mode when $T_{CP}$ is 1 ms.

FIGS. 8 and 9 show comparison values of dynamic power consumption according to $T_{CP}$ and a power saving mode. In FIGS. 8 and 9, a power consumption simulation curve PS1 denotes a simulation result of power consumption in case of employing a cross-correlation based carrier sensing method, a power consumption simulation curve PS2 indicates a simulation result of a power, detection based carrier sensing method. A power consumption curve PS3 indicates a simulation result of power consumption in case of employing an energy detection based carrier sensing method. A curve PS off denotes a simulation result of power consumption in case of not employing the method of the present invention. The graph of FIG. 8 shows the power consumption efficiency in the power saving mode is about 12-times better than the power consumption efficiency without using the power saving mode when a carrier is not properly sensed due to a bad channel state. However, the power consumption is almost the same regardless of a type of the power saving mode or whether the power saving mode is used or not when carrier sensing is always successful.

The graph of FIG. 9 clearly shows the power consumption reduces more than 12 times regardless of a channel state although $T_{CP}$ is large, although carrier is well sensed, or although carrier is not sensed. Among the embodiments of the present invention, an energy detection based carrier sensing method has the best efficiency, a power detection based carrier sensing method the second best efficiency, and a cross-relation based carrier sensing method has the worst efficiency. Although the cross-relation based method has the worst efficiency, the cross-relation based method has better efficiency than other conventional methods.

Figure 10:
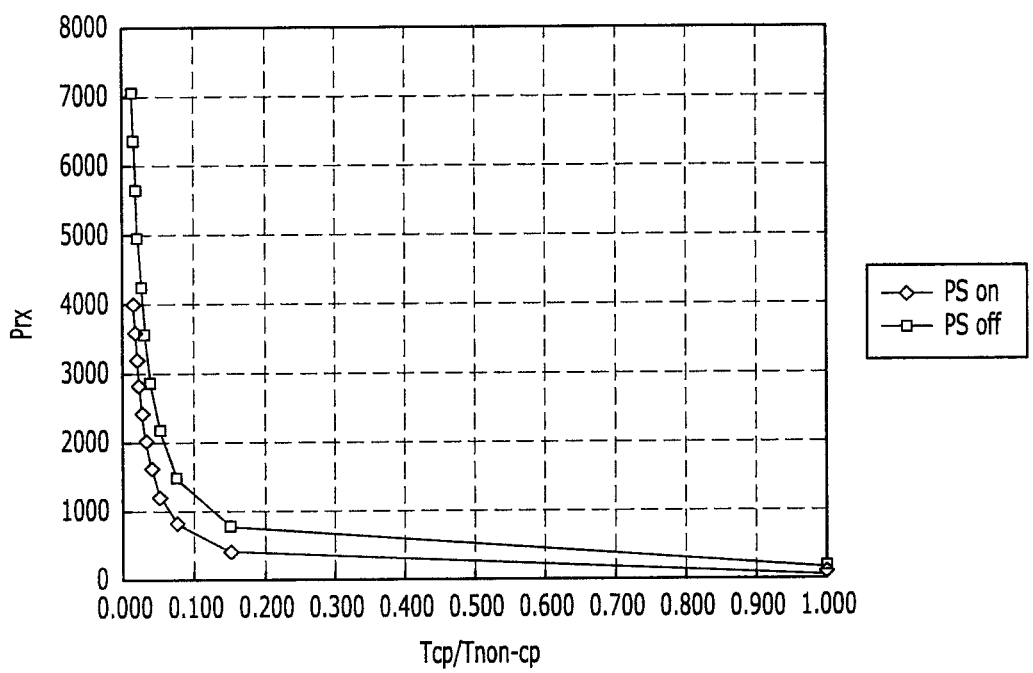
FIGS. 10 and 11 are simulation graphs for comparing dynamic power consumption according to a ratio of a carrier sensing period and a period after a carrier is sensed.
Figure 11:
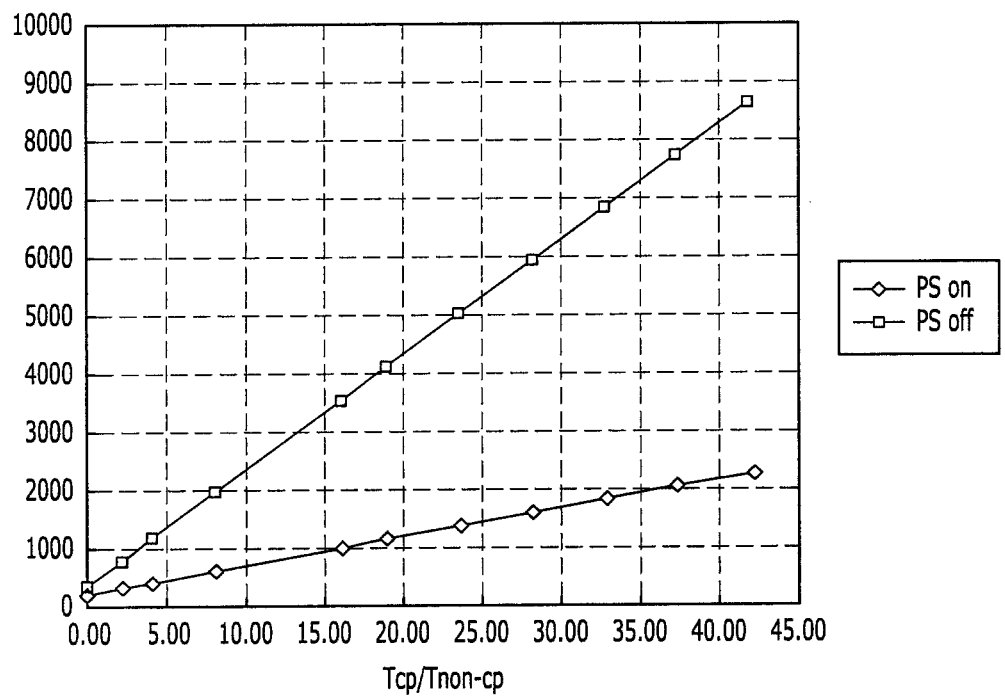

FIGS. 10 and 11 are graphs for comparing dynamic power consumption during a carrier sensing period or after carrier sensing. FIG. 10 shows a simulation result when $P_{cs}/P_{data}$ smaller than 1, and FIG. 11 shows a simulation result when $P_{cs}/P_{data}$ is larger than 1. In order to obtain the simulation results of FIGS. 10 and 11, the power detection based carrier sensing method according to an embodiment of the present invention is used.

If $T_{cp}/T_{non-cp}$ is smaller than 1, a waiting period for carrier sensing is shorter than a data recovery period. That is, the waiting period is shorter than a period with signals existed. It means that signals are continually existed in a channel. On the contrary, if $T_{cp}/T_{non-cp}$ is larger than 1, signals are intermittently generated in a channel. As shown in the simulation result of FIG. 10, when signals are continually inputted, the power consumption efficiency is improved about two times compared with the related art. Also, the simulation result of FIG. 11 shows that the power saving method of the present embodiment improves the power consumption efficiency about three times compared to the related art.

Hereinafter, simulation results using equations will be verified by comparing the simulation results with actual experimental data using a modeling scheme.

At first, the modeling scheme will be described with reference to FIG. 12.

Figure 12:
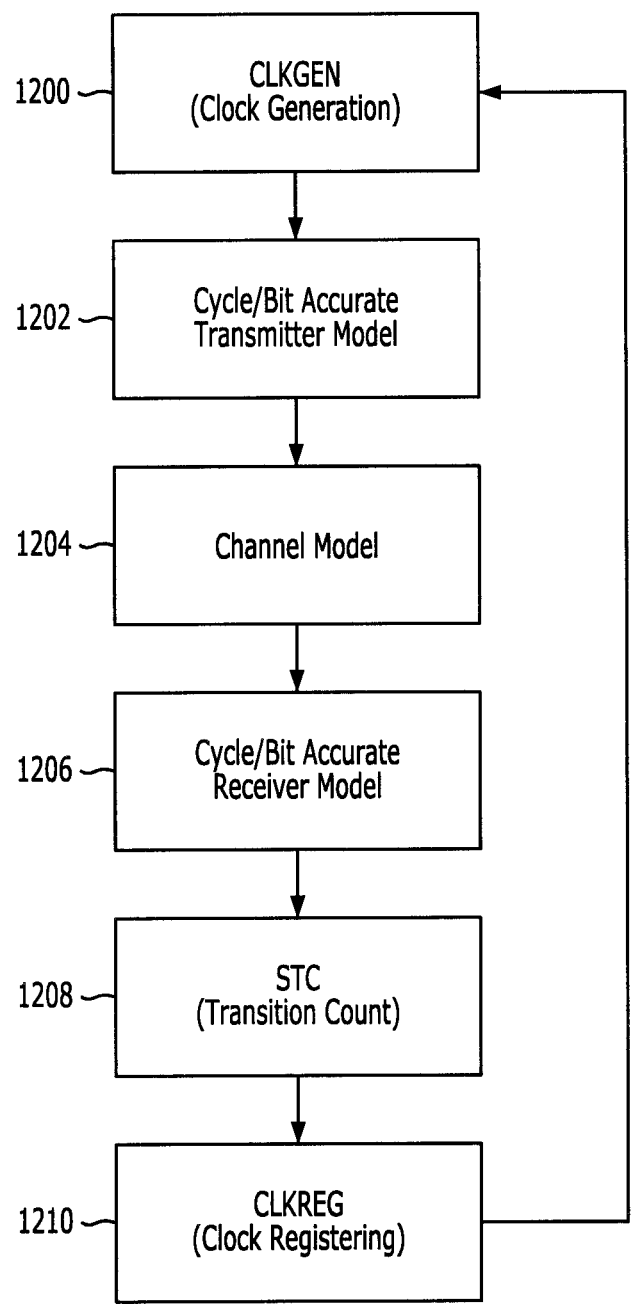
FIG. 12 is a flowchart illustrating a method for designing a power saving receiver for a high-speed wireless communication system and an apparatus for measuring power consumption efficiency.

FIG. 12 is a flowchart illustrating a method of designing a power saving receiver for a high-speed wireless communication system and a modeling method for measuring power consumption efficiency of an apparatus.

In the present embodiment, a C modeling scheme having the same hardware structure is proposed. The hardware structure according to the present embodiment operates based on a clock and includes a flip-flop with limited bits and wires unlike a simulator depending on mathematic equations. As a method for accurately counting the number of transitions of a flip-flop, a simulation of transition count (STC) method is used. The STC model includes six models and operates like the flowchart of FIG. 12.

A clock generator CLKGEN model 1200 generates and supplies a clock for a system. The transmitter model (Cycle/Bit Accurate Transmitter Model) 1202 is modeled to accurately match a clock and a bit like a hardware structure of a transmitter. That is, the clock generator model 1200 and the transmitter model 1202 are modeled as constituent elements of a transmitter.

The channel model 1204 is modeled for performing simulation in various wireless channel environments.

In a receiving part, a receiver model (Cycle/Bit Accurate Receiver Model) 1206 is modeled to match a clock and a bit according to a hardware structure of a receiver. A transition counter model 1208 is a block for counting transiting a bit sequence in all of flip-flops corresponding to a clock. Therefore, the clock registering model 1210 stores a clock supplied to a receiver.

Here, the STC modeling uses a method shown in Table 1.

TABLE 1

```
void STC ( int bin,      //I, n-bit flip-flop
          int bin_D,    //I, Delayed n-bit flip-flop
          int len,      //I,   Binary length
          int *Tcnt     //O,  Transition count result
)
{
   int ind;                //index
   int count=0;
   for(ind=len-1;ind>=0;ind--){
      if( ((bin >> ind) & 0x1)!=((bin_D >> ind) & 0x1) )
         count++;
   }
   * Tcnt = count;}
```

In Table 1, bin denotes an output of a flip-flop, bin_D denotes an input of a flip-flop, and a clock registering model 1210 is a model to reflect a clock delayed value delayed by bin_D to bin. STC receives two values bin and bin_D, compares a bit sequence as long as a length of a flip-flop with a corresponding clock, and outputs the number of transitions Tcnt.

Table 2 shows example codes for modeling the clock generator model 1200 and the clock registering model 1210.

TABLE 2

```
void CLKGEN ( int sys_clkX,   //I, system clock
              int reset_n,     //I, asynchronous reset
              int *clkX2       //O, generated clock
)
{
   if(sys_clkX || !reset_n){
      if(!reset_n)   clkX2 = 0;
      else           clkX2 =((cnt_clk & 0xN) == 1);
   }
}
void CLKREG ( int clkX2,      //I, local clock
              int reset_n,     //I, asynchronous reset
              FF_D,           //I, flip-flop input
              int *FF         //O, flip-flop output
)
{
   if(clkX2 || !reset_n){
      FF.wn = FF_D.wn;
   }
}
```

In Table 2, the clock generator model 1200 receives a system clock sys_clkX of X MHz and divides the received system clock to clocks clkx2 of X2 MHz. For example, the clock generator model 1200 may receive an 80 MHz system clock and divide the 80 MHz system clock into 20 MHz divided clocks. In this case, N is 3. The clock registering model 1210 receives FF_D input when a clock clkx2 becomes 1 and outputs an output FF in order to model the operation of a flip-flop according to the clock X2 MHz.

Figure 13:
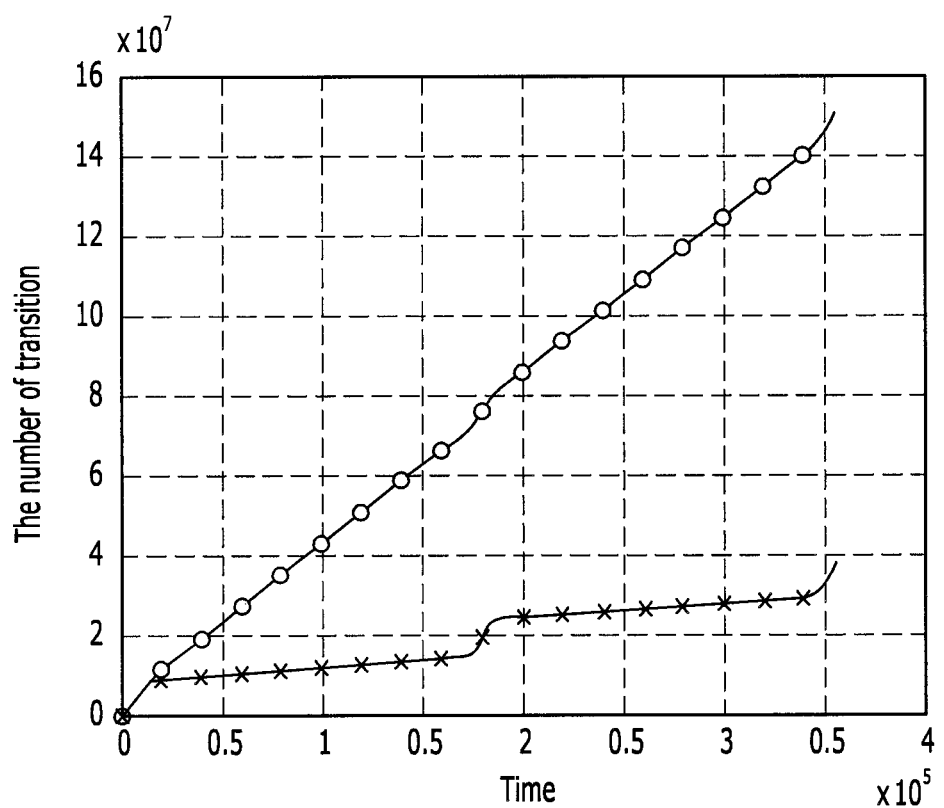
FIG. 13 is a graph comparing power consumption of a power saving mode using a STC modeling method in accordance with an embodiment of the present invention.

FIG. 13 shows power consumption reduction effect of a power detection based carrier sensing method according to an embodiment of the present invention. A graph of FIG. 13 shows power consumption of a STC modeling based power saving method according to the present invention and power consumption of the related art.

In order to perform a simulation for obtaining power consumption curves of FIG. 13, the simulation is performed in a general office environment with two transmission antennas and three receiving antennas. In order to clearly show the power consumption reduction effect of the STC modeling based power saving method according to the present invention, the graph shows a simulation result during a period of three 1000-byte packets. Here, an interval between packets is about 1 ms. In FIG. 13, a curve with 'o' shows power consumption of the related art that uses three antennas and controls a receiver always in a waiting state. A curve with 'x' shows power consumption of the STC modeling based power saving method according to the present invention which uses one antenna for a carrier sensing period, and uses two antennas and supplies a clock to a receiving block after a carrier is sensed.

As shown in the graph of FIG. 13, the power saving method according to the present embodiment, which is the STC modeling based power saving method, reduces power consumption.

As described above, the receiver according to the present embodiment can minimize power consumption. Particularly, the receiver according to the present embodiment can reduce power consumption without degrading a receiving performance of a wireless receiver. Since the present invention can be used with various power saving methods, it is possible to reduce power consumption more effectively.

While the present invention has been described with respect to the specific embodiments, it will be apparent to those skilled in the art that various changes and modifications may be made without departing from the spirit and scope of the invention as defined in the following claims.

What is claimed is:

1. An apparatus for processing a signal in a receiver of a wireless communication system, comprising:
   a carrier sensor configured to sense a carrier used in the wireless communication system;
   a decoder configured to decode the detected carrier signal to a signal and data;
   a clock gating circuit; and
   a controller configured to control:
      supplying power and clock only to the carrier sensor, and not to the decoder, during carrier sensing,
      supplying power and clock, using the clock gating circuit, to the decoder after the carrier sensor senses a carrier, and
      interrupting the supplying of power and clock, using the clock gating circuit, to the decoder after the detected carrier signal has been decoded,
   wherein, in response to the receiver obtaining virtual carrier sensing in a MAC layer by receiving information about a channel occupying time of a second receiver, the controller interrupts supplying of power and clock to the carrier sensor during the channel occupying time of the second receiver.

2. The apparatus of claim 1, wherein the controller controls supplying power and clock for carrier sensing only to the carrier sensor corresponding to one antenna when sensing a carrier when the receiver uses a plurality of antennas.

3. The apparatus of claim 2, wherein the controller controls supplying power and clock to a receiver corresponding to all of receiving antennas.

4. The apparatus of claim 1, wherein the clock gating circuit comprises a latch and an AND gate.

5. The apparatus of claim 1, wherein the controller is further configured to control interrupting the supplying of power and clock, using the clock gating circuit, to the carrier sensor after the carrier sensor senses a carrier.

6. A method for processing a signal in a receiver of a wireless communication system, wherein the receiver comprises a carrier sensor, a clock gating circuit, a decoder, and a controller, the method comprising:
   supplying a clock to the carrier sensor, and not to the decoder, during carrier sensing of the receiver;
   sensing, by the carrier sensor, a carrier;
   supplying, using the clock gating circuit, the clock to the decoder after the sensing the carrier;
   decoding, by the decoder, a packet transmitted from the carrier; and
   interrupting, using the clock gating circuit, the supplying of clock to the decoder after the decoding the packet,
   in response to the receiver obtaining virtual carrier sensing in a MAC layer by receiving information about a channel occupying time of a second receiver, interrupting supplying of power and clock to the carrier sensor during the channel occupying time of the second receiver.

7. The method of claim 6, wherein when the receiver uses a plurality of antennas, power and clock for carrier sensing are supplied to a carrier sensor corresponding to one antenna when a carrier is sensed.

8. The method of claim 7, wherein power and clock are supplied to a receiving unit corresponding to all of receiving antennas after a carrier is sensed.

9. The method of claim 6, wherein the clock gating circuit comprises a latch and an AND gate.

10. The method of claim 6, further comprising: interrupting, using the clock gating circuit, the supplying of clock to the carrier sensor after the sensing the carrier.

* * * * *